(12) United States Patent
Nielsen et al.

(10) Patent No.: US 8,520,268 B2
(45) Date of Patent: Aug. 27, 2013

(54) APPARATUS FOR SCANNING A SURFACE WITH ELECTROMAGNETIC RADIATION

(75) Inventors: Jan Ernst Nielsen, Frederikssund (DK); Lars Steen Christensen, Helsinge (DK)

(73) Assignee: Sign-Tronic AG, Widnau (CH)

( * ) Notice: Subject to any disclaimer, the term of this patent is extended or adjusted under 35 U.S.C. 154(b) by 1093 days.

(21) Appl. No.: 11/568,552

(22) PCT Filed: Apr. 26, 2005

(86) PCT No.: PCT/DK2005/000282
§ 371 (c)(1),
(2), (4) Date: Aug. 6, 2007

(87) PCT Pub. No.: WO2005/107233
PCT Pub. Date: Nov. 10, 2005

(65) Prior Publication Data
US 2007/0285652 A1   Dec. 13, 2007

(30) Foreign Application Priority Data
May 3, 2004   (DK) ................................ 2004 00698

(51) Int. Cl.
H04N 1/04   (2006.01)
(52) U.S. Cl.
USPC .......................................................... 358/474

(58) Field of Classification Search
USPC .................................. 358/474, 476, 479, 497
See application file for complete search history.

(56) References Cited

U.S. PATENT DOCUMENTS

| | | | |
|---|---|---|---|
| 4,406,525 A | * | 9/1983 | Itoh et al. .................... 359/226.1 |
| 4,941,056 A | | 7/1990 | Hemmingsen et al. |
| 4,947,450 A | | 8/1990 | Billiotte et al. |
| 6,119,536 A | | 9/2000 | Popovic et al. |

FOREIGN PATENT DOCUMENTS

| | | |
|---|---|---|
| EP | 0603430 | 6/1994 |
| EP | 1313304 | 5/2003 |

* cited by examiner

Primary Examiner — Jeremiah Bryar
(74) Attorney, Agent, or Firm — Price Heneveld LLP

(57) ABSTRACT

Disclosed is an apparatus for scanning a surface with electromagnetic radiation. The apparatus comprises a base plate for supporting a medium said medium having a scanning surface to be scanned, an optical head unit adapted to scan the scanning surface with electromagnetic radiation propagating along an optical axis, a fluid film generation unit connected to the optical head unit and adapted to generate a fluid film between the scanning surface and a gliding surface of the fluid film generation unit for maintaining a predetermined distance between the gliding surface and the scanning surface during scanning operation of the optical head unit across the scanning surface, and control means for controlling the position of the fluid film relative to the optical axis.

19 Claims, 8 Drawing Sheets

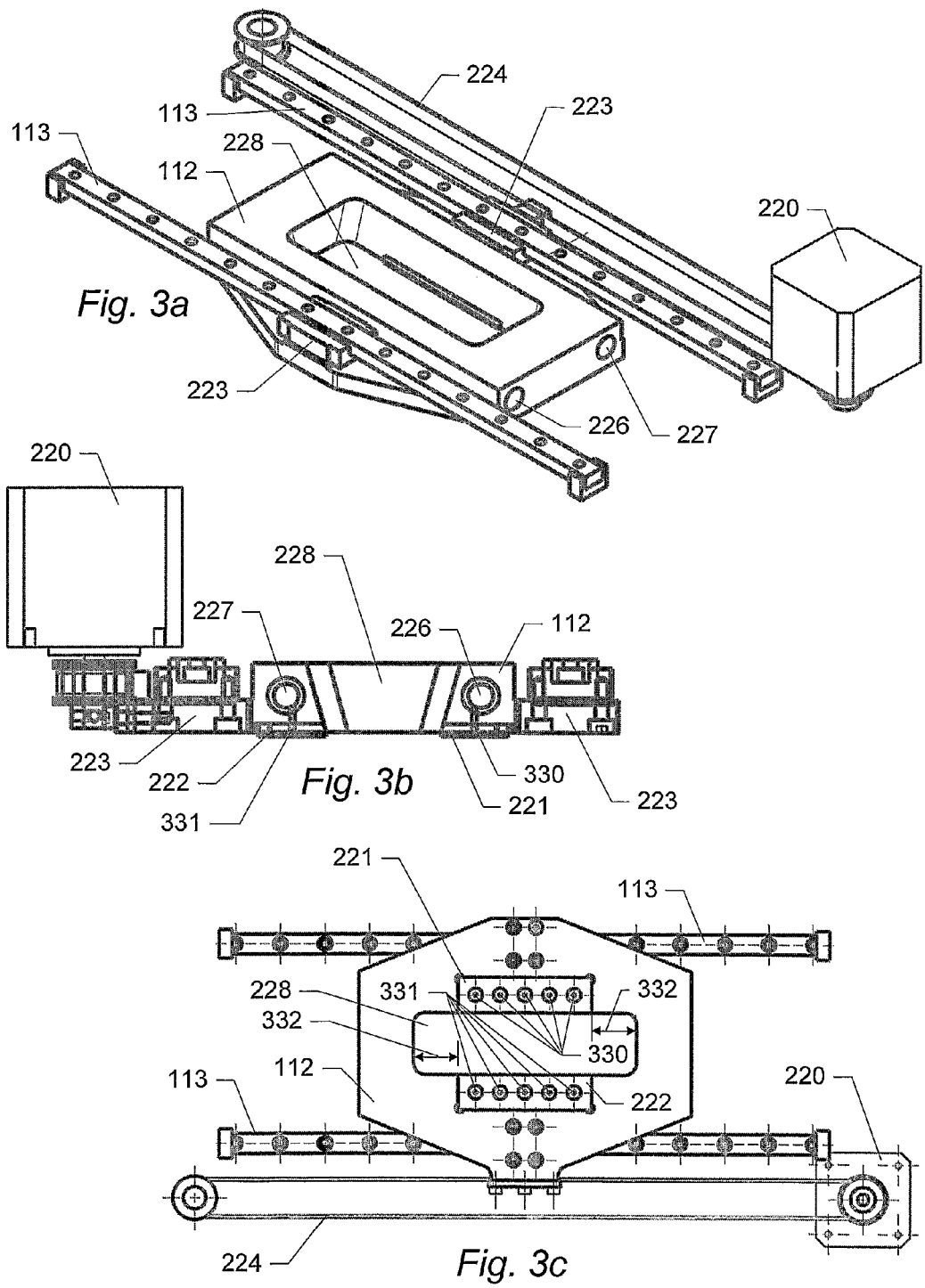

APPARATUS FOR SCANNING A SURFACE WITH ELECTROMAGNETIC RADIATION

BACKGROUND OF THE INVENTION

The present invention relates to an apparatus for scanning a surface with electromagnetic radiation, such as a printer or a scanner.

The scanning of a surface with electromagnetic radiation is used in many applications.

In particular, many printers use an electromagnetic beam to expose a printing medium having a printing surface that is sensitive to the electromagnetic radiation of the beam. In order to expose the printing material according to predetermined digital input data, the electromagnetic beam is typically scanned across the printing surface and modulated according to the digital data. When the printing surface is a flat surface, such a printer is generally referred to as a flatbed printer.

Furthermore, optical scanners utilize electromagnetic radiation to obtain digital information from an original, e.g., electronic document, by scanning the original in longitudinally successive, transversally extending sections by means of a semiconductor camera or other radiation detector.

In such applications, it is generally desirable to maintain a constant distance between the optical system used in the scanning process and the surface to be scanned. The unit comprising the optical system will be referred to as the optical head or—in case of a printer—the print head.

U.S. Pat. No. 4,941,065 discloses a scanning apparatus where a semiconductor camera is guided across the original, or across a glass plate covering the original, in a transversely arranged, longitudinally displaceable portal-shaped device.

According to the above prior art apparatus, the distance between the original—or the glass plate covering the original—and the camera is maintained by the camera being moved directly across the original or the glass plate, respectively. This allows an exact adjustment of the distance between the camera and the original to be made, although in the latter instance, the intermediate glass plate is not quite planar. In order to avoid scratching the surface of the glass plate, the distance between the camera and the original or the glass plate covering the original is maintained by means of a fluid film generation unit that causes the camera unit to "float" on a film of pressurized air. The fluid film generation unit comprises a ring-shaped member with downwardly directed openings through which pressurized air is provided. The camera is positioned such that it receives light through the central aperture of the ring. This allows an adjustment of the distance from the camera to the upper surface of the original or the glass plate (whichever is uppermost), to be made without the semiconductor camera physically contacting the original or the glass plate, respectively.

However, in particular in printing applications, it is often not desirable to cover the printing medium with a protective glass plate. In many applications, the scanning beam is a light beam in the ultra-violet (UV) region which would be distorted by the glass plate. Hence, it is desirable to scan with a print head unit directly across the printing plate placed on a base plate. On the other hand, a scanning with a UV beam generally requires a particularly accurate control of the distance between the printing surface and the print head, because in such systems the aperture of the optical system is typically large, resulting in a small depth of focus.

Furthermore, it is often desirable to print on the entire area of a printing plate, in particular without leaving an unexposed margin at the edges of a printing plate. However, at the edges of the printing surface, the fluid film of the above prior art system is disturbed due to the height difference between the upper surface of the printing plate and the upper surface of the underlying base plate on which the printing plate is placed. Consequently, it is a problem of the above prior art apparatus to accurately control the distance between the optical head and the surface of the medium to be scanned even at the edges of the medium.

SUMMARY OF THE INVENTION

The above and other problems are solved by an apparatus for scanning a surface with electromagnetic radiation, the apparatus comprising: a base plate for supporting a medium, said medium having a scanning surface to be scanned; an optical head unit adapted to scan the scanning surface with electromagnetic radiation propagating along an optical axis; a fluid film generation unit connected to the optical head unit and adapted to generate a fluid film between the scanning surface and a gliding surface of the fluid film generation unit for maintaining a predetermined distance between the gliding surface and the scanning surface during scanning operation of the optical head unit across the scanning surface; and control means for controlling the position of the fluid film relative to the optical axis.

In particular, by providing control means for controlling the position of the fluid film relative to the optical axis, the optical head may be positioned with the optical axis at the edge of the scanning surface without the fluid film on which the optical head unit "floats" crossing the edge of the scanning surface, thereby accurately maintaining the distance between the optical head and the scanning surface.

It is a further advantage that the optical head can scan across the edges of the printing surface without damaging the edges or causing damages to the print head itself.

The scanning surface may be the surface of a printing medium to be exposed, such as a printing plate or sheet. In alternative embodiments, the scanning surface may be the surface of an original object, e.g., an original document, image, or the like, to be scanned. In some embodiments, the medium may be covered by a protective layer, e.g., a glass plate. Hence, the term scanning surface is intended to refer to the surface most proximate to the gliding surface of the fluid film generation unit from which a predetermined distance is to be maintained.

Preferably, the control means is adapted to control the position of the fluid film in synchronism with the scanning operation of the optical head, in particular, in response to the position of the optical head relative to the scanning surface. In some embodiments, the position and size of the scanning surface is pre-set, e.g., by an operator. In other embodiments, the position of the edges of the scanning surface are detected automatically by the apparatus, e.g., by detecting a change in the distance to the scanning surface, by detecting a change in the reflectivity of the surface under the optical head, or the like. An automatic detection of the edges of the scanning surface has the advantage that damages of the scanning surface and/or the optical head caused by a possible misalignment of the medium are avoided.

It is understood that the present invention may be applied to any type of scanning/printing system where an accurate distance between a scanning surface and an optical head is to be maintained while scanning across the surface. In particular, depending on the application, the electromagnetic radiation may be of any suitable wavelength. For example, an optical scanner may be operated in the visible part of the electromagnetic spectrum. Many printers for producing print plates, on the other hand, are operated in the infra-red part of the spectrum, the visible part, or in the ultra-violet part of the spectrum. The scanning beam may be generated by a laser or by a different light source. In particular, various types of digital image exposure systems have been disclosed which use two-dimensional spatial light modulators such as a liquid crystal display or a micro mirror array. Furthermore, depending on the application, the optical head may be the source of the radiation and direct a beam towards the scanning surface, or the optical head may receive radiation from the scanning surface. In both situations, an accurately maintained distance corresponding to the focal length of the optical system is important for the quality of the scanning result.

When the fluid film generation unit is adapted to cause the fluid film to cover only a predetermined portion of the surface of the fluid film generation unit that faces the scanning surface, the distance between the optical head and the scanning surface may be controlled more accurately, even in the presence of irregularities/unevenness of the scanning surface and, in particular, even when the irregularities extend over a small area.

In a preferred embodiment, the fluid film generation unit is adapted to cause one or more fluid films to be distributed around a fluid film center, and wherein the control means is adapted to control a displacement of the fluid film center from the optical axis.

In a particularly preferred embodiment, the fluid film generation unit is movably mounted on the optical head.

Accordingly, the displacement is preferably controlled by configuring the control means to cause a relative motion of the fluid film generation unit in synchronization with the scanning motion of the optical head. In particular, the fluid film generation unit is moved relative to the optical axis when the optical head approaches an edge of the scanning surface, thereby moving the position of the fluid film relative to the optical axis and ensuring that the fluid film does not cross the edge of the scanning surface.

In particular, when the optical head approaches a transversal edge of the scanning surface relative to the scanning direction of the optical head, the fluid film generation unit is preferably moved relative to the optical axis along the scanning direction and away from the transversal edge towards the central portion of the scanning surface. This ensures that the optical axis may be positioned all the way at the edge without the fluid film crossing the edge. Hence, the fluid film still provides full support to the optical head and ensures a constant floating height, i.e., a constant distance between the optical head and the scanning surface.

In a preferred embodiment, the longitudinal movement of the fluid film generation unit is ensured by mounting the fluid film generation unit on at least one guide member connected to a bottom surface of the optical head unit, thereby providing a stable longitudinal motion of the fluid film generation unit without inducing fluctuations in the direction of the optical axis. Examples of suitable guide members include one or more rails or shafts, a prismatic guide, or the like.

In another preferred embodiment, the relative motion includes a pivotal movement of the fluid film generation unit around the optical axis. Hence, the position of the fluid film relative to the optical axis may be controlled both in a longitudinal direction relative to the scanning direction and in a transversal direction relative to the scanning direction. Consequently, when scanning immediately along a longitudinal edge of the scanning surface, the fluid film generation unit can be displaced transversally away from the longitudinal edge.

According to yet another preferred embodiment, the fluid film generation unit comprises a number of openings for delivering a fluid directed towards the scanning surface. Hence, the extension and geometry of the fluid film within the plane of the gliding surface is controlled by the distribution of openings. Preferably, the openings are distributed within at least a first predetermined area within the gliding surface, the first predetermined area preferably being smaller than the gliding surface.

According to a further preferred embodiment, at least one of the number of openings is at least partially filled with a porous material allowing the fluid to penetrate. The term porous material is intended to comprise any material that allows the fluid to penetrate but which provides a predetermined resistance to the flow of the fluid. Examples of suitable porous materials include carbon, bronze, and steel. Consequently, even when the opening approaches an edge of the scanning surface, the resistance of the porous material dampens the flow of the fluid through the opening, thereby contributing to the maintenance of a constant pressure and, thus, a constant floating height, even if the fluid film approaches, or even crosses an edge of the scanning surface.

In another preferred embodiment, the openings have the form of a hole, e.g., a drilled nozzle. The hole or nozzle preferably feeds into a small recess or pocket in the gliding surface. It is an advantage of this embodiment that a large floating height may accurately be maintained. This is particularly important when printing on printing plates with a sensitive emulsion as a printing surface. In such an application, a floating height of several tens of micrometers, e.g., 35-40 µm is desired, in order not to damage the emulsion.

In yet a further preferred embodiment, the number of openings comprises a first and a second subset of openings wherein each subset is distributed within a respective predetermined area within the gliding surface and arranged around a respective fluid film center at a respective radial distance from the optical axis; and wherein the control means is adapted to separately control the gas supply to the first and second subsets of openings.

Hence, the position of the fluid film relative to the optical axis can be controlled by selectively feeding fluid through one or more of the respective subsets of openings. It is an advantage of this embodiment that no mechanical movement of the fluid film generation unit relative to the optical head is required.

In a preferred embodiment, the fluid is a pressurized gas, preferably pressurized air. Hence, in this embodiment, the fluid film has the form of an "air cushion".

In a preferred embodiment, the gas is provided by a gas supply unit via a gas supply line to said openings or, in the case of multiple sets of openings, by a plurality of gas lines, each line feeding gas to a respective set of openings. The gas supply may thus be individually controlled via one or more valves. Furthermore, the pressure of the gas fed into the openings determines the floating height of the optical head.

When at least one gas supply line comprises a buffer tank between the gas supply unit and the openings, the pressure maintained in the fluid film is maintained more accurately.

In yet another preferred embodiment, the apparatus further comprises suspension means for suspending the optical head with the gliding surface facing the base plate.

Typically, the optical head is suspended over a substantially horizontal scanning surface, i.e., the optical axis is directed downwardly and the fluid film generates an upwardly directed force on the optical head counterbalancing the weight of the optical head. It is a further advantage that the weight of the optical head via the fluid film generates a corresponding downwardly directed force acting on the scanning medium, thereby pressing the scanning medium onto the base support and increasing the evenness of the scanning surface.

Preferably, the suspension means comprises a parallelogram linkage relative to a support unit permitting movement of the optical head along the direction of the optical axis.

Further preferred embodiments are disclosed in the dependant claims.

According to another aspect of the invention, the above and other problems are solved by an apparatus for scanning a surface with electromagnetic radiation, the apparatus comprising: a base plate for supporting a medium, said medium having a scanning surface to be scanned; an optical head unit adapted to scan the scanning surface with electromagnetic radiation propagating along an optical axis; a fluid film generation unit connected to the optical head unit and adapted to generate a fluid film between the scanning surface and a gliding surface of the fluid film generation unit for maintaining a predetermined distance between the gliding surface and the scanning surface during scanning operation of the optical head unit across the scanning surface; wherein the fluid film generation unit comprises at least one opening directed towards the scanning surface through which a fluid is dispensed/provided; and wherein at least one opening is at least partially filled with a porous material allowing the fluid to penetrate.

Consequently, even when the opening approaches an edge of the scanning surface, the resistance of the porous material dampens the flow of the fluid through the opening, thereby contributing to the maintenance of a constant pressure and, thus, a constant floating height, even if the fluid film approaches, or even crosses an edge of the scanning surface.

The term porous material is intended to comprise any material that allows the fluid to penetrate but which provides a predetermined resistance to the flow of the fluid. Examples of suitable porous materials include carbon, bronze, and steel.

The apparatus according to the second aspect of the invention has one or more preferred embodiments corresponding to the preferred embodiments described in connection with the first-mentioned apparatus and disclosed in the dependant claims.

BRIEF DESCRIPTION OF DRAWINGS

The above and other aspects of the invention will be apparent and elucidated from the embodiments described in the following with reference to the drawings in which:

FIG. 3 shows a more detailed view of a movable fluid film generation unit;

In the drawings, like numerals refer to like or similar components, features, etc.

DETAILED DESCRIPTION OF PREFERRED EMBODIMENTS

Figure 1:
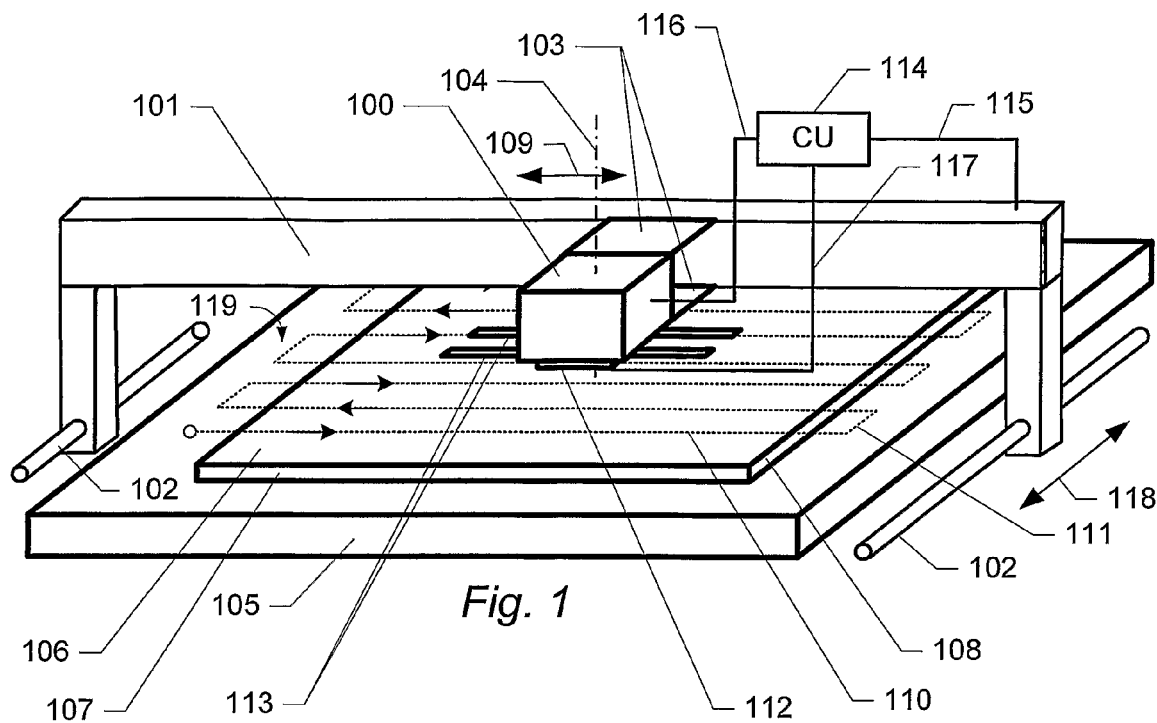
FIG. 1 schematically shows a perspective view of a flatbed printer with a movable fluid film generation unit.

FIG. 1 schematically shows a perspective view of a flatbed printer with a movable fluid film generation unit. The flatbed printer of FIG. 1 exposes a printing surface 119 of a printing plate 106 by scanning the printing surface in longitudinal successive, transversally extending strips illustrated by the dotted line 110. The printer has an optical print head generally designated 100 that houses an optical system for directing a light beam towards the printing surface along an optical axis 104. The light beam is modulated according to digital data representing the image/pattern to be printed. Hence, the print head should be moved across the surface at a constant distance between the print head and the printing surface, to ensure a uniform printing quality and, in particular, a uniform focus of the optical system.

The print head 100 is movably mounted to a portal shaped support structure 101 such that the print head can be moved in a longitudinal direction 109 across the printing surface. The support structure is further movably mounted on guides or threaded shafts 102 in a transversal direction 118. Hence, after a longitudinal scan, the print head is moved in the transversal direction allowing the print head to expose a new stripe in the next longitudinal scan. The amount of transversal displacement 111 corresponds to the width of the longitudinal scan lines 110. The longitudinal movement of the print head along the support structure and transverse movement of the support structure are caused by suitable motors (not shown) such as step motors. An example of a scanning apparatus for an optical scanner with a portal shaped support is disclosed in U.S. Pat. No. 4,941,056 which is incorporated herein by reference in its entirety.

It is understood that alternative means for providing a relative motion of the print head and the printing surface may be provided. For example, the support plate may be moved rather than the print head.

The printing plate 106 is placed on—and preferably affixed to—the base plate 105. Typically, the printing plate is built up as a layered structure comprising a base and a radiation-sensitive printing layer. For example, a typical printing plate used in the graphical industry has an aluminum base with a radiation-sensitive emulsion.

In a preferred embodiment, the printing plate 106 is affixed to the base plate by vacuum suction. For this purpose, the base plate is provided with a plurality of small, upwardly open holes connected to a vacuum pump (not shown). Hence, the printing plate is protected against displacement during the scanning operation and, at the same time, the printing plate is kept flat, i.e., the evenness of the printing surface 119 is increased. Alternatively, the printing plate may be affixed by other means, e.g., by a protective layer, such as a glass plate, by a frame structure, or the like.

In any case, there is typically a height difference between the printing surface 119 and the surface of the base plate, corresponding to the thickness of the printing plate. Typical printing plates are 0.1 mm-0.4 mm thick, e.g., 0.3 mm. In FIG. 1, the printing plate is positioned on the base plate with longitudinal edges 107 in the direction of the longitudinal scanning direction 109 and with transverse edges 108 transverse to the scanning direction. In many applications, it is desirable that the entire printing surface is scanned i.e., without any margins. Consequently, the longitudinal scan lines 110 extend all the way to the transverse edges 108. In FIG. 1, the longitudinal scans extend even beyond the printing surface, as indicated by the transverse line segments 111, thereby allowing the printing head to be decelerated and accelerated while the scanning beam is outside the area of the printing surface.

The print head 100 is mounted to the support structure 101 by a suspension arrangement formed by parallel leaf springs 103 that provide a parallelogram linkage between the print head and the support structure, thereby allowing the print head to be vertically displaced, i.e., in the direction of the optical axis. In alternative embodiments, other suspension arrangements may be used, e.g., vertical shafts, rails, or other guides. A fluid film generation unit 112 is mounted at the bottom of the print head 100 providing a film of pressurized air between the print head and the printing surface 119 on which the print head floats. Hence, the print head glides contact-free across the printing surface. The fluid film generation unit 112 allows maintaining a constant distance between the print head and the printing surface 119, even in the presence of irregularities of the printing plate.

The fluid film generation unit 112 is movably connected to the print head 100 via guides 113 that allow a longitudinal movement of the fluid film generation unit 112 relative to the print head. This relative movement allows the fluid film to be maintained even when the print head approaches or even crosses the transverse edges 108 of the printing surface, as will be described in greater detail below.

The scanning operation of the print head 100, the modulation of the light beam, and the operation of the fluid film generation unit 112 are controlled by a control unit 114 via respective control signal connections 115, 116, and 117, respectively. The control unit 114 may be a suitably programmed microprocessor, a suitably programmed computer, a dedicated control circuit, or any other suitable processing means. In particular, the term processing means also comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. In one embodiment, the control unit has stored therein information about the position and dimensions of the printing plate on the base plate. In some embodiments, this information may include pre-set default values and/or values entered by an operator. Alternatively or additionally, the information may be automatically detected and/or verified, e.g., by detecting the edges of the printing plate by suitable sensors, such as one or more distance sensors and/or one or more reflectivity sensors, and/or the like.

Figure 2:
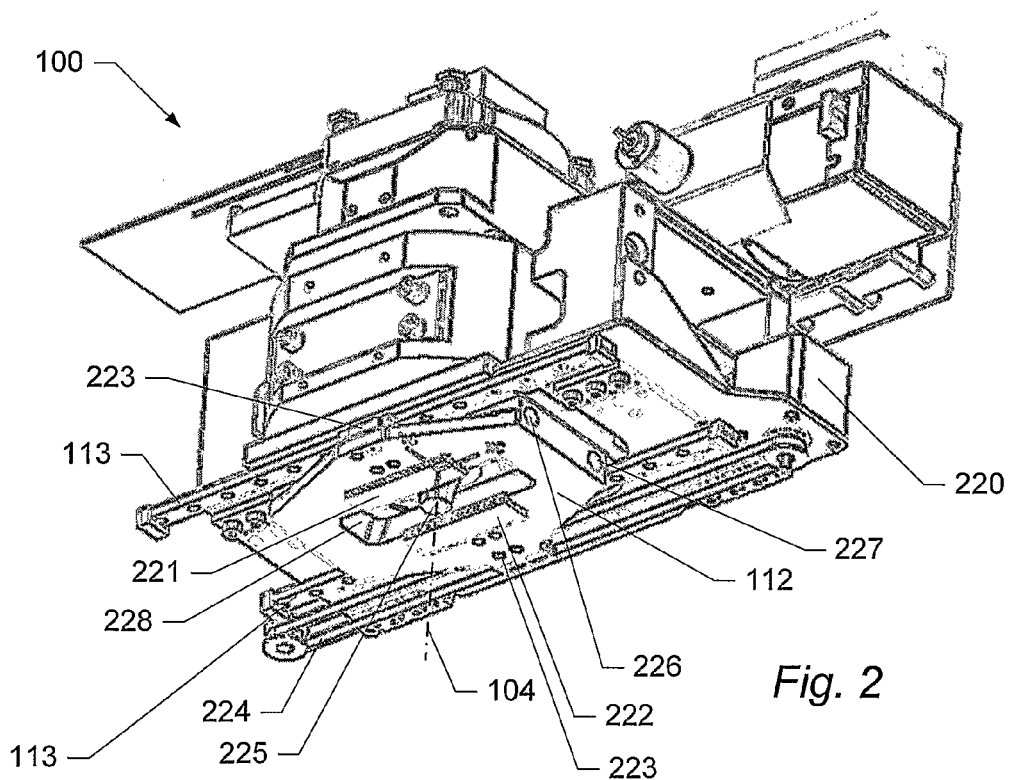
FIG. 2 shows a perspective view of a print head with a movable fluid film generation unit.

FIG. 2 shows a perspective view of a print head with a movable fluid film generation unit. The print head 100 comprises an optical system for producing a light beam that is directed downwardly from a beam output 225 along an optical axis 104 defined by the optical system. An example of an optical system including a light modulator is disclosed in European patent application EP 1394732 which is incorporated herein by reference in its entirety.

The print head 100 has rails 113 mounted at its bottom surface. The fluid film generation unit 112 is movably connected to the rails 113 via sliders 223, allowing an accurate translational movement of the fluid film generation unit 112 relative to the print head 100. The fluid film generation unit 112 is moved along the rails 113 by a step motor 220 via a belt 224 that is connected to one of the sliders 223. The fluid film generation unit 112 has an aperture/cut-out 228 through which the scanning beam from the beam output 225 propagates towards the printing surface. The aperture 228 is elongated in the longitudinal direction of the scanning direction. Adjacent to the longitudinal sides of the aperture 228, the fluid film generation unit 112 is provided with gliding surfaces 221 and 222 adapted to generate fluid films between the respective gliding surfaces and the printing surface. As will be described in greater detail below, each of the gliding surfaces is provided with openings for ejecting pressurized air that generates a gas film in the gap between the gliding surface and the printing surface when the print head floats over the printing surface. The fluid film generation unit 112 further comprises two air supply channels 226 and 227 for supplying pressurized air to the openings of the gliding surfaces 221 and 222, respectively.

FIG. 2 shows the fluid film generation unit in a position where the beam output 225 and the optical axis 104 are located in the center of the elongated aperture 228 between the gliding surfaces, i.e., at the center of the fluid films generated by the gliding surfaces 221 and 222. Hence, in this embodiment, the total gliding surface comprises two separate areas 221 and 222, each with a respective set of openings. When the fluid film generation unit is in the position shown in FIG. 1 and when pressurized air flows through the openings in both gliding surfaces, a fluid film is built up on both sides of the optical axis, both in the longitudinal direction and in the transverse direction. However, when the fluid film generation unit is moved along the rail, the gliding surfaces and, thus, the fluid film generated under them, is moved relative to the optical axis 104. In particular, the fluid film generation unit can be displaced such that the optical axis 104 is not placed between the gliding surfaces 221 and 222 but still projects through the aperture 228.

The gliding surfaces 221 and 222 are formed as protrusions projecting out of the bottom surface of the fluid film generation unit 112. Consequently, the gliding surfaces are the parts of the bottom surface of the fluid film generation unit that are most proximate to the printing surface, thereby determining the minimum distance between the fluid film generation unit and the printing surface. Furthermore, the gliding surfaces are located in the immediate proximity of the elongated aperture 228.

FIG. 3 shows a more detailed view of a movable fluid film generation unit.

FIG. 3a shows a perspective view of the fluid film generation unit 112 that is movably mounted to rails 113 via gliders 223 and driven by a step motor 220 via a belt 224.

FIG. 3b shows a cross-sectional view of the fluid film generation unit. The cross section shows the gliding surfaces 221 and 222 on the longitudinal sides of the elongated aperture 228 for the scanning beam. Each gliding surface is provided with holes 330 and 331, respectively, with downwardly directed openings/orifices in the respective gliding surface. The holes are in fluid connection with air supply channels 226 and 227, respectively, such that air supply channel 226 supplies pressurized air to holes 330 of gliding surface 221, while air supply channel 227 supplies pressurized air to holes 331 of gliding surface 222. Hence, since the gliding surfaces each have a separate air supply, the fluid film on each side of the aperture 228 is individually controllable.

Preferably, the gliding surfaces 221 and 222 that provide the fluid film are kept as small as possible and are positioned as close to the optical axis 104 as possible, thereby providing an accurate distance between a small area of the printing surface and the printing head, where the small area is close to the optical axis. Hence, an accurate exposure is achieved even in the presence of irregularities of the printing surface.

FIG. 3c shows a bottom view of the fluid film generation unit. The bottom view shows the gliding surfaces 221 and 222 on each side of the aperture 228. The gliding surfaces are elongated in the scanning direction. In one embodiment, each gliding surface has a dimension of 60 mm×16 mm. This dimension of the gliding surface has been found to provide sufficient support to the print head. The fluid film generation unit in FIG. 3 has five openings in each gliding surface, and the openings are linearly arranged along the longitudinal sides of the aperture 228. Furthermore, the elongated aperture 228 extends beyond the gliding surfaces 221 and 222 in the longitudinal direction, i.e., it has a larger longitudinal dimension than the gliding surfaces. Consequently, when the fluid film generation unit is positioned with the optical axis of the print head projecting through the aperture 228 within the regions indicated by arrows 332, the optical axis projects towards the printing surface outside the area covered by the fluid film.

FIG. 4 schematically illustrates the operation of a movable fluid film generation unit.

Figure 4A:
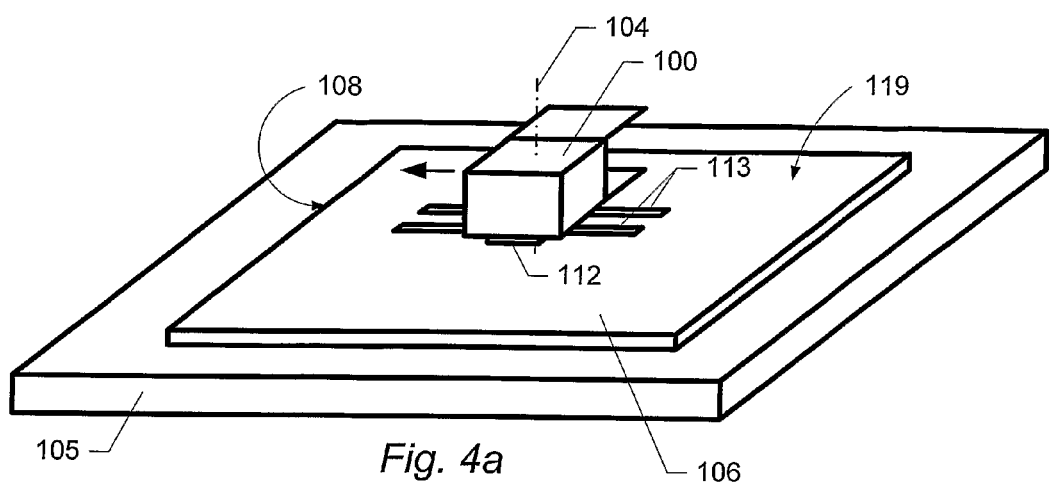
FIG. 4 schematically illustrates the operation of a movable fluid film generation unit.

FIG. 4a schematically shows a print head 100 positioned over the central portion of a printing plate 106. The printing plate in turn is placed on a base plate 105. The printing head 100 floats on a fluid film generated by a fluid film generation unit 112 as described above and in the following. The printing head scans across the printing surface 119 in a longitudinal direction indicated by arrow 435. As described in connection with FIGS. 1-3 above, the fluid film generation unit 112 is mounted on rails 113 allowing it to be moved relative to the print head 100 in the longitudinal direction 435. In FIG. 4a, the fluid film generation unit is positioned relative to the optical head such that the optical axis is aligned with the center of the gliding surfaces, i.e., the fluid films are distributed around the optical axis.

Figure 4B:
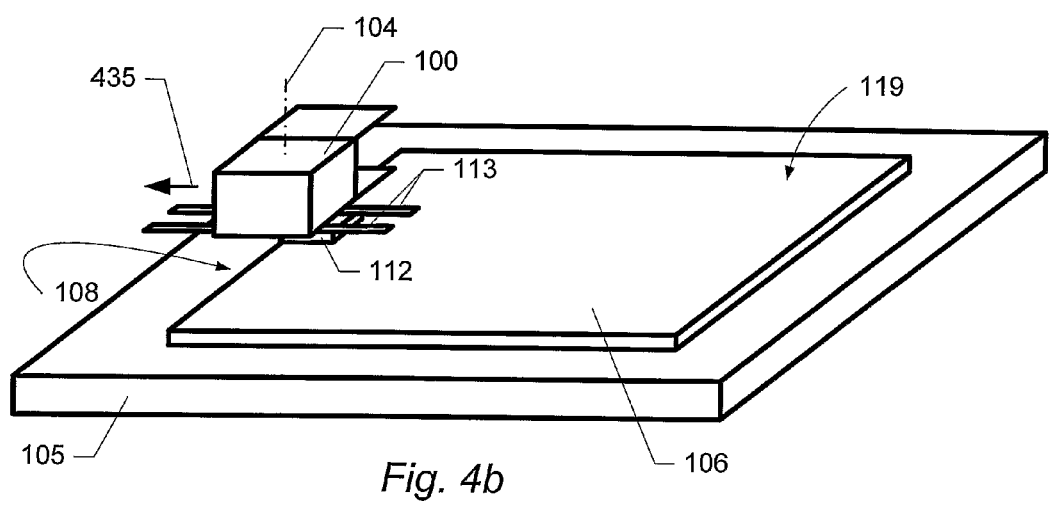

FIG. 4b schematically shows the print head 100 when it has reached the edge 108 of the printing plate, i.e., when the optical axis of the scanning beam is aligned with the edge 108. In this position, the fluid film generation unit 112 is displaced relative to the print head 100 in the longitudinal direction, i.e., the fluid films under surfaces 221 and 222 are distributed around a center that is displaced from the optical axis. This displacement causes the fluid film to be generated entirely above the printing surface 119 and, consequently, to fully support the weight of the printing head. Therefore, the distance between the print head and the printing surface is maintained constant and it is avoided that the print head slides off the edge 108 of the printing plate. As illustrated in FIG. 4b, in this position, the rails 113 still extend beyond the fluid film generation unit 112, thereby allowing a further relative displacement of the fluid film generation unit beyond what is required for an alignment of the optical axis with the edge of the printing plate.

Figure 4C:
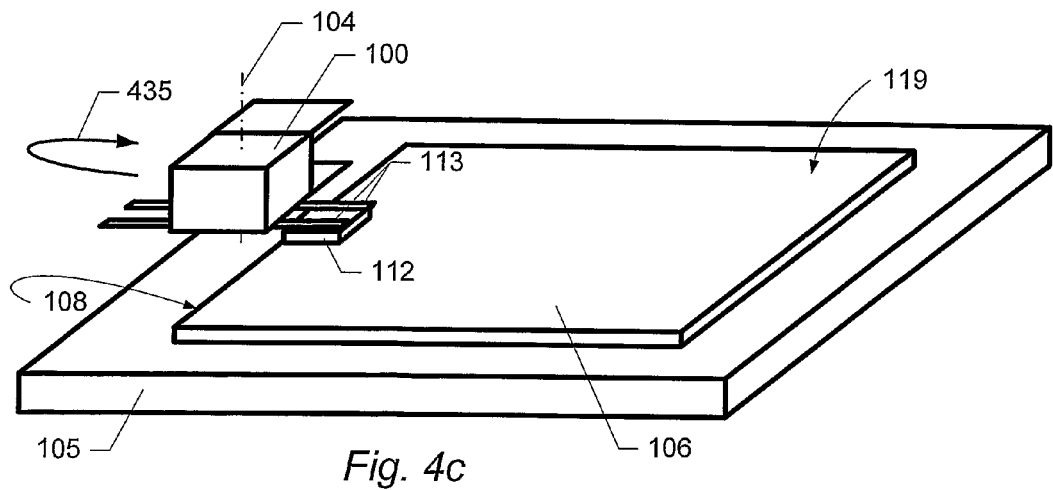

Consequently, the print head may be moved beyond the edge of the printing plate without significantly reducing the floating height, as is illustrated by FIG. 4c. FIG. 4c schematically shows the print head 100 when it is moved beyond the edge 108 of the printing plate, i.e., when the optical axis 104 does not intersect the printing surface anymore. This additional movement allows the printing head to be decelerated and re-accelerated in the opposite direction, in order to initiate a longitudinal scan in the opposite direction.

Consequently, the optical axis can be scanned across the entire printing surface at a constant speed and at a constant distance between the print head and the printing surface. With the apparatus described herein, the floating height of the print head has been maintained at 35-40 µm with an accuracy of ±5 µm. This accuracy can be maintained even at high longitudinal scanning speeds of up to 400 mm/s. Thus, the apparatus allows high scanning speeds while providing high scanning quality.

It is understood that the accuracy requirements for the floating height are less strict in the deceleration/acceleration zone, as no focal distance of the optical system has to be maintained.

It is a further advantage that damages to the printing surface and, in particular, to the edges of the printing surface, are avoided. It is a further advantage of the large floating height that damages of the printing surface due to small particles getting stuck in the gap between the gliding surfaces and the printing surface are avoided.

Figure 5:
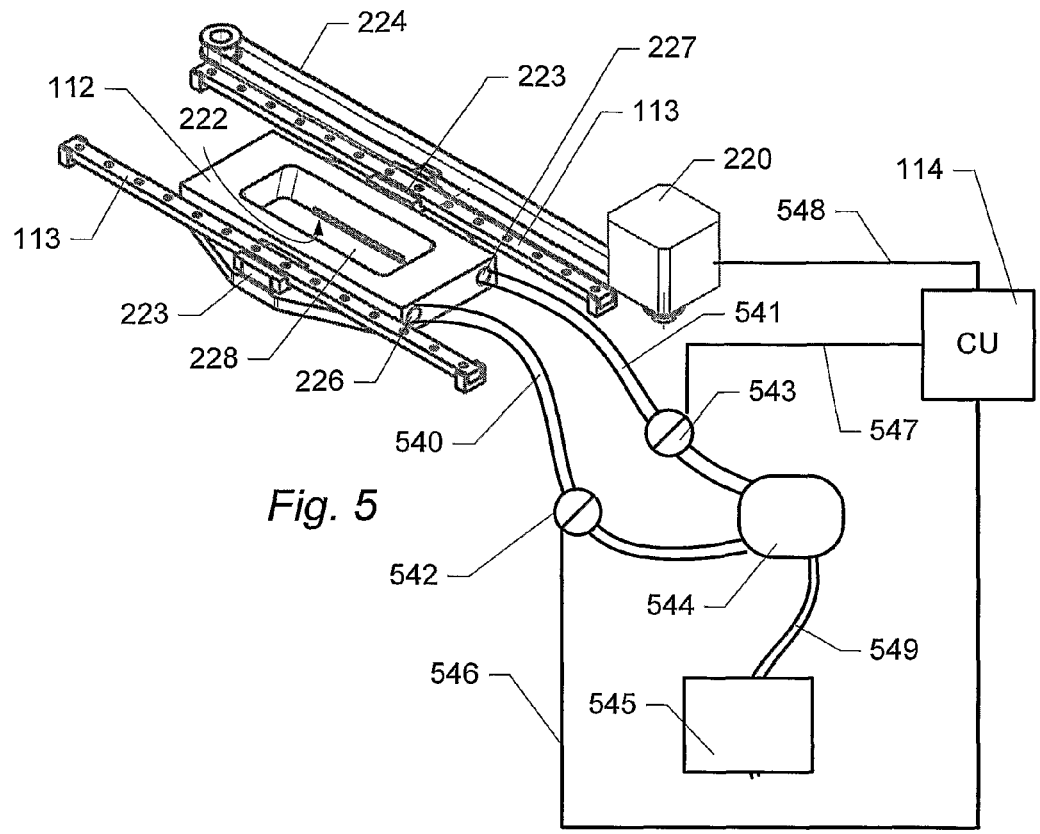
FIG. 5 schematically illustrates the control and gas supply circuits of a movable fluid film generation unit.

FIG. 5 schematically illustrates the control and gas supply circuits of a movable fluid film generation unit. As already described in connection with FIG. 3, the fluid film generation unit 112 comprises two air supply channels 226 and 227 each connected to the openings of one of the gliding surfaces.

Hence, the fluid film generated on each side of the aperture 228 is individually controllable, thereby allowing a control of the position of the fluid film that supports the print head.

For this purpose, each of the gas supply channels 226 and 227 is connected to a corresponding gas supply line 540 and 541, respectively. Pressurized air is generated by an air supply unit 545 that generates dried, pressurized air at a predetermined pressure, such as 2-3 bar, e.g., 2.5 bar. Preferably, the air pressure is adjustable to allow an adjustment of the floating height. The air is fed via line 549 and a buffer tank 544 into lines 540 and 541. Each of the supply lines 540 and 541 is provided with a valve 542 and 543, respectively. The operation of the valves 542 and 543 is controlled by the control unit 114 via control signals 546 and 547, respectively. Hence, the air flow to the two gliding surfaces is controlled separately by opening and closing of the corresponding valve 542 or 543. The buffer tank 544 improves the stability of the pressure in supply lines 540 and 541, in particular when one of the valves is operated. In an alternative embodiment, instead of the two separate valves 542 and 543, a two-way valve is provided between the buffer tank and the two supply lines 540 and 541 for switching the gas flow between the two gas lines. In some embodiments, at least one of the gas lines 540 and 541 comprises a throttle valve allowing a relative adjustment of the pressure under the gliding surfaces 221 and 222. In further alternative embodiments, each gliding surface is supplied from a separate pneumatic system.

The control unit 114 further controls the step motor 220 via control signal 548. Hence, the control unit controls the relative position of fluid film by controlling both the movement of the fluid film generation unit 112 along the rails 113 and the air supply to openings in the respective gliding surfaces.

The control of the position of the fluid film by controlling the air supply to openings in the respective gliding surfaces will now be illustrated with reference to FIGS. 6 through 9.

Figure 6:
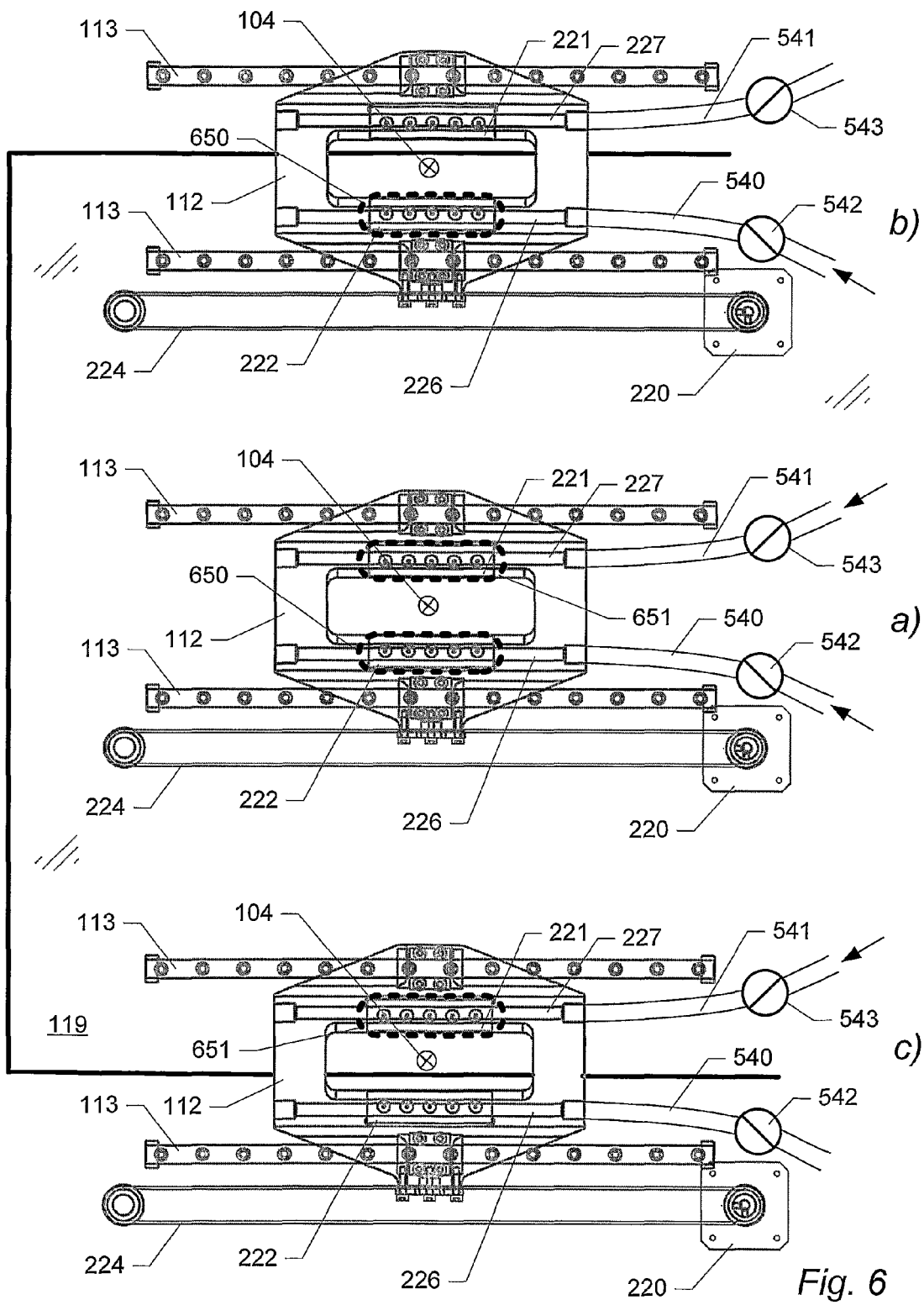
FIG. 6 schematically illustrates the operation of the plurality of sets of openings of a fluid film generation unit.

FIG. 6 schematically illustrates the operation of the plurality of sets of openings of the fluid film generation unit.

FIG. 6a shows the fluid film generation unit 112 described above in a position over a printing surface 119 such that both gliding surfaces 221 and 222 are positioned over the printing surface. In this position, both valves 542 and 543 are open and pressurized air is supplied to the openings of both gliding surfaces. Hence, fluid films are generated in the gaps between the gliding surfaces and the printing surface as illustrated by the dotted lines 650 and 651. Hence, in this position, the fluid films are distributed around the optical axis 104.

FIG. 6b shows the fluid film generation unit 112 in a position close to a longitudinal edge 107 of the printing surface corresponding to a longitudinal scan line along the longitudinal edge. In this position, only gliding surface 222 is located above the printing surface, while gliding surface 221 is located beyond the edge 107 of the printing surface, i.e., directly above the surface of the base plate. Hence, only gliding surface 222 can provide support to the printing head at a well-defined distance from the printing surface. If air was pumped through the openings of gliding surface 221 in this position, no fluid film would be built up, as the gap between the gliding surface 221 and the surface of the base plate is too large to allow a fluid film to be maintained. Therefore, in order to maintain a constant pressure in the gas supply system, valve 542 is closed, while valve 543 is left open, thereby providing a resulting fluid film that is displaced with respect to the optical axis.

FIG. 6c shows the fluid film generation unit 112 in a position close to the opposite longitudinal edge 107 of the printing surface. Consequently, in this position, valve 543 is closed, while valve 542 is left open.

Figure 7:
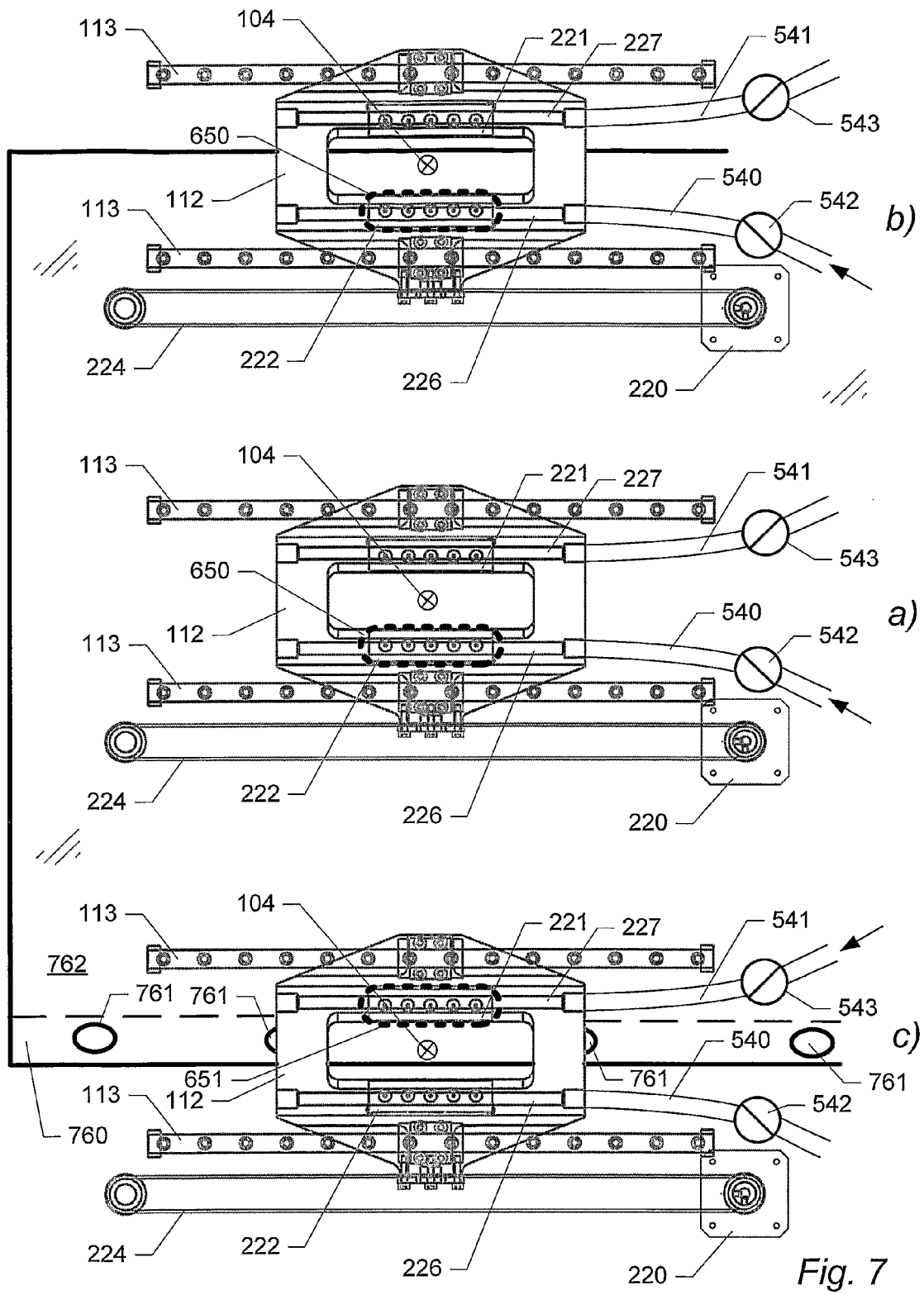
FIG. 7 schematically illustrates another embodiment of the operation of the plurality of sets of openings of the fluid film generation unit.

FIG. 7 schematically illustrates another embodiment of the operation of the plurality of sets of openings of the fluid film generation unit.

In this embodiment, the air supply to the gliding surfaces of the fluid film generation unit described above is controlled similarly to the embodiment of FIG. 6. However, in this embodiment, air is supplied only to the openings of one gliding surface at a time. In particular, when the fluid film generation unit 112 is positioned with both gliding surfaces located above the printing surface, only gliding surface 222 is activated. This situation is illustrated by FIG. 7a. The situations of FIGS. 7b and 7c where only one gliding surface is located above the printing surface is identical to the corresponding situations of FIGS. 6b and 6c, respectively, i.e., only one of the valves corresponding to the gliding surface located above the printing surface is open.

Hence, in this embodiment, the print head is supported by the fluid film under gliding surface 222 only, except when gliding surface 222 is located outside the area of the printing surface as in FIG. 7c. This has the advantage that the floating height of the printing head can be controlled even more uniformly over the entire printing surface, as possible differences in floating height due to two or one fluid films being active at a time are avoided.

Furthermore, many printing plates are provided with alignment holes along one edge of the printing plate for use during subsequent mounting of the printing plate for reproduction. The margin comprising the holes is often used for information which is not intended as part of the final document to be produced based on the printing plate, e.g., information intended for the printing operator, bar codes, or the like. Hence, in this situation, the quality requirements for the information printed on this margin are less strict than for the remainder of the printing area.

In FIG. 7, a printing plate with a margin area 760 and alignment holds 761 is shown. Preferably, in the embodiment of FIG. 7, the fluid film generation unit is controlled such that the non-margin area 762 is scanned with one gliding surface 222 active, while the margin area 760 is scanned with the other gliding surface 221 active, thereby achieving a uniform printing quality within non-margin area 762, while possible differences in the floating height caused by the switch between gliding surface 222 and gliding surface 221 only affect the margin area 760.

Figure 8:
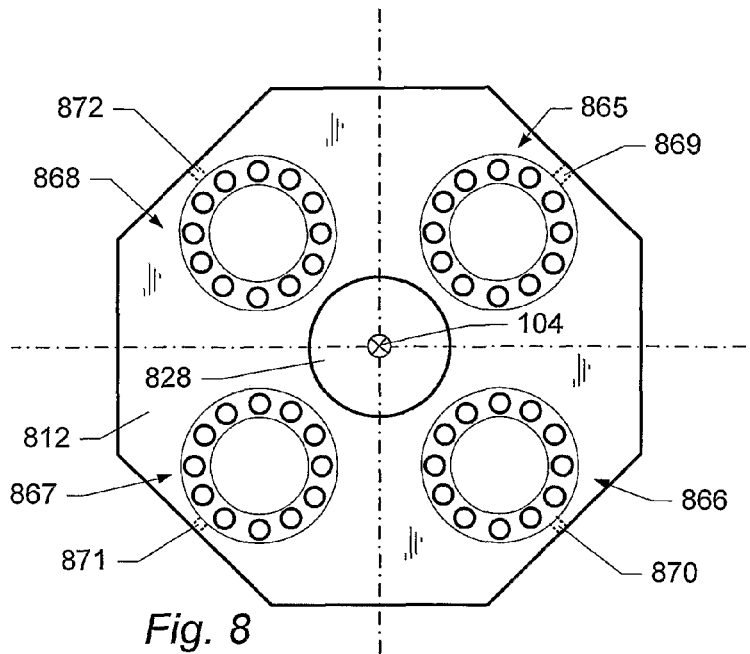
FIG. 8 shows a bottom view of a fluid film generation unit with four sets of openings.

FIG. 8 shows a bottom view of a fluid film generation unit with four sets of openings. The fluid film generation unit 812 of FIG. 8 comprises four sets of openings 865, 866, 867, and 868 arranged around a central cut-out 228 through which the optical axis 104 projects. In this example, each set of openings is arranged as a circle. However, other arrangements are possible as well. Each set of openings is in fluid connection with a separate gas supply channel 869, 870, 871, and 872, respectively. Hence, the air flow through each of the sets of openings can be controlled separately. Consequently, the position of the fluid film(s) supporting the print head can be controlled by selectively providing air to one or more of the sets of openings as will be illustrated with reference to FIG. 9.

Figure 9:
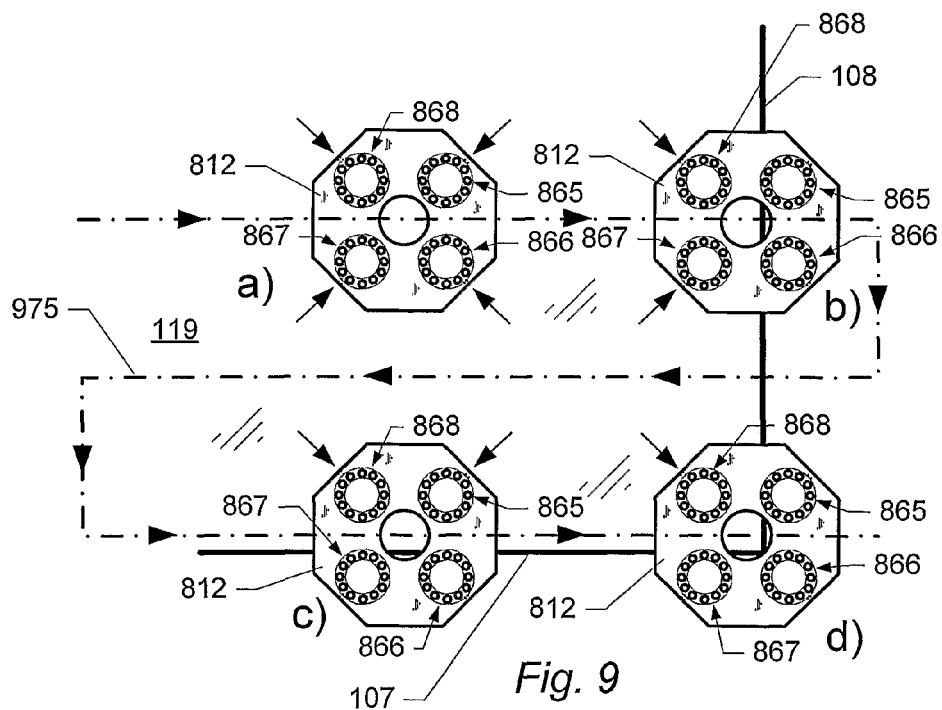
FIG. 9 schematically illustrates the operation of a fluid generation unit with four sets of openings.

FIG. 9 schematically illustrates the operation of a fluid generation unit with four sets of openings FIGS. 9a-d show different positions of the fluid film generation unit 812 of FIG. 8 over a printing surface 119, e.g., during a scanning operation along a scanning path as illustrated by the dashed dotted line 975.

FIG. 9a illustrates the fluid film generation unit 812 over the central portion of a printing surface 119 where all four sets of openings 865, 866, 867, and 868 are located entirely above the printing surface 119. In this position, pressurized air is supplied to all four sets of openings, e.g., by controlling corresponding valves (not shown). Hence, fluid films are generated in the gap between the bottom surface of the fluid film generation unit 812 and the printing surface such that the fluid film is distributed around the optical axis 104.

FIG. 9b shows the fluid film generation unit 812 in a position close to a transversal edge 108 of the printing surface corresponding to a longitudinal scan line. In this position, only the sets 867 and 868 of openings are located above the printing surface 119, while the sets 865 and 866 are located beyond the edge 108 of the printing surface. Hence, only the sets 867 and 868 of openings can provide support to the printing head at a well-defined distance from the printing surface. Therefore, pressurized air is only supplied to openings 867 and 868, thereby providing a resulting fluid film that is displaced with respect to the optical axis.

FIG. 9c shows the fluid film generation unit 812 in a position close to a longitudinal edge 107 of the printing surface corresponding to a longitudinal scan line. In this position, only the sets 865 and 868 of openings are located above the printing surface 119, while the sets 866 and 867 are located beyond the edge 107 of the printing surface. Hence, only the sets 865 and 868 of openings can provide support to the printing head at a well-defined distance from the printing surface. Therefore, pressurized air is only supplied to openings 865 and 868, thereby providing a resulting fluid film that is displaced with respect to the optical axis.

Finally, FIG. 9d shows the fluid film generation unit 812 in a position close to a corner of the printing surface 119. In this position, only the set 868 of openings is located above the printing surface 119, while the sets 865, 866 and 867 are located outside the printing surface. Hence, only the set 868 of openings can provide support to the printing head at a well-defined distance from the printing surface. Therefore, pressurized air is only supplied to openings 868, thereby providing a resulting fluid film that is displaced with respect to the optical axis.

Figures 10, 11, 13:
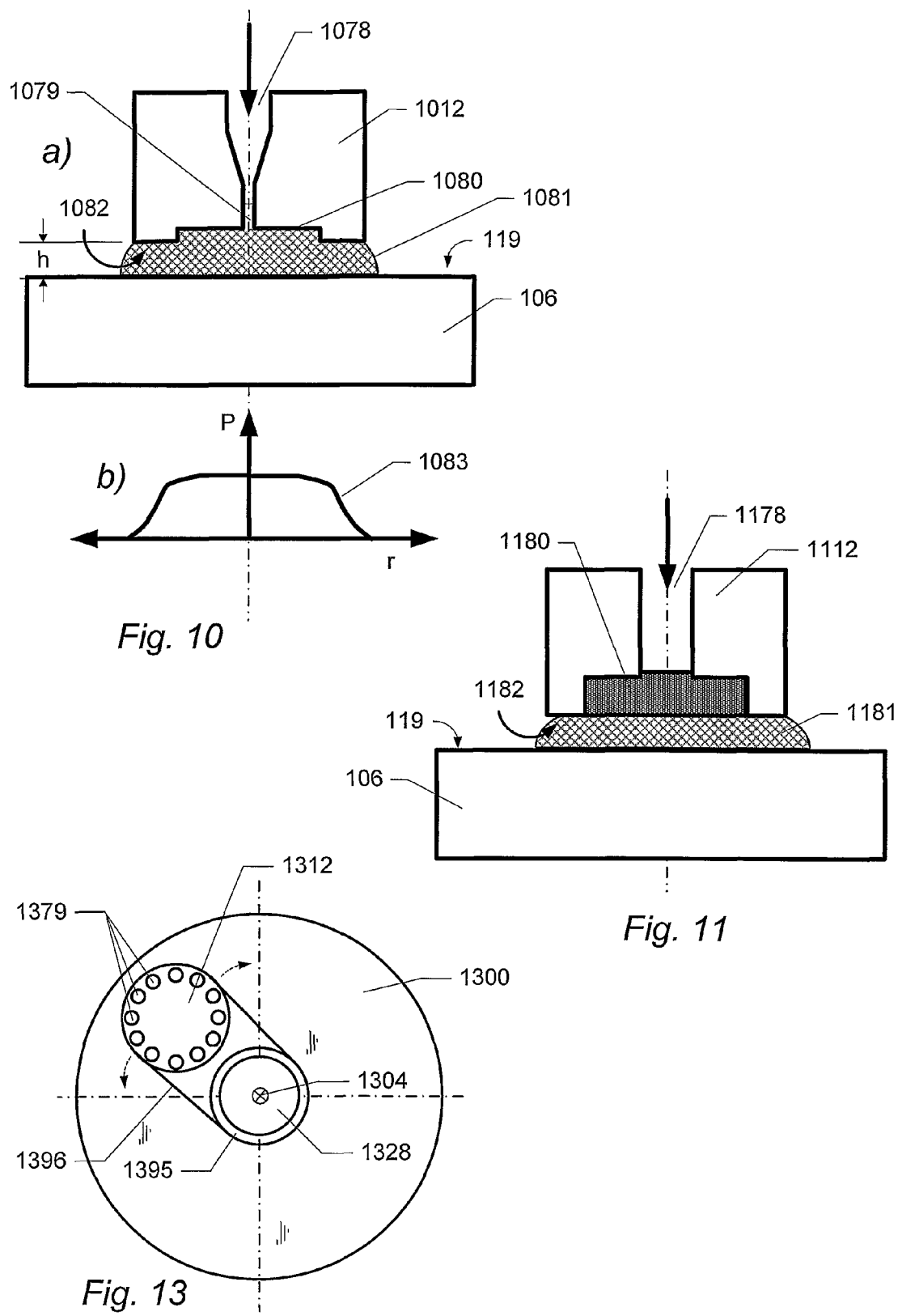
FIG. 10 shows an opening of a fluid film generation unit.
FIG. 11 shows an opening of a fluid film generation unit with a porous material.
FIG. 13 schematically shows a bottom view of another embodiment of a movable fluid film generation unit.

FIG. 10 shows an opening of a fluid film generation unit.

FIG. 10a shows a cross-sectional view of an opening of a fluid film generation unit. The opening has the form of a hole 1079 in the gliding surface 1082 of the fluid film generation unit 1012. The gliding surface has a small recess 1080 or pocket around the hole 1079. In one embodiment, a hole diameter of 1.2 mm and a recess diameter of 6 mm was used.

The hole 1079 extends to a gas supply channel 1078 for providing a flow of pressurized air through the hole 1079 in a downward direction into the gap between the gliding surface 1082 and the printing surface 119 of a printing medium 106. The air flow causes a fluid film 1081 to be generated in the gap between the gliding surface 1082 and the printing surface 119 on which film the fluid film generation unit floats. The thickness h of the film 1081 depends on the geometry of the holes and the fluid generation unit, on the weight to be supported and on the pressure of the pressurized air. Hence, for a given fluid film generation unit, the floating height can be controlled via the pressure of the pressurized air.

FIG. 10b schematically illustrates the pressure distribution 1083 of the fluid film as a function of the radial distance r from the center of the hole 1079.

FIG. 11 shows a cross-sectional view of an opening of a fluid film generation unit. The opening has the form of a hole 1178 feeding into a recess filled with a porous material 1180, such as carbon, bronze or steel. When a flow of pressurized air is provided through the hole 1178, the air penetrates the porous material 1180 and enters the gap between the gliding surface 1182 and the printing surface 119 of a printing medium 106, thereby causing a fluid film 1181 to be generated as described above. It is an advantage of the porous material that it dampens the air flow. Consequently, even if the print head crosses the edge of the printing surface such that part of the area under which the fluid film is built up crosses the edge, the pressure drop in the fluid film is reduced due to the dampening effect of the porous material. This causes the print head to maintain a certain distance from the printing surface, thereby reducing the risk of damaging the printing surface.

Figure 12:
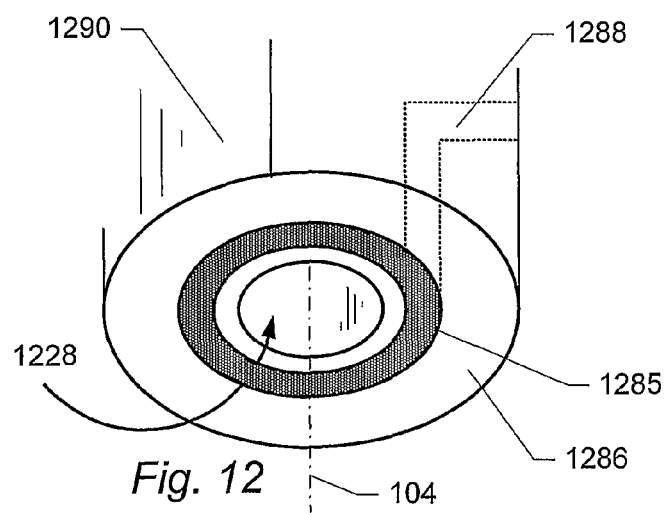
FIG. 12 shows a perspective view of a fluid film generation unit with a porous material.

FIG. 12 shows a perspective view of a fluid film generation unit with a porous material. The fluid film generation unit has the form of an annular body 1290 with a central hole 1228 through which the optical axis 104 projects. The bottom surface 1286 of the annular body 1290 comprises an annular opening 1285 that is filled with a porous material as described in connection with FIG. 11. The annular opening 1285 is connected to an air supply channel 1288 for feeding pressurized air into the opening 1285.

FIG. 13 schematically shows a bottom view of another embodiment of a movable fluid film generation unit. In this embodiment, a fluid film generation unit 1312 is mounted under an optical head 1300 that defines an optical axis 1304 of a scanning beam. The fluid film generation unit 1312 has one or more openings 1379 in its bottom surface for generating a fluid film as described herein. The fluid film generation unit 1312 is pivotally mounted via an axial member 1396 on a shaft 1395. The shaft 1395 has a hole 1328 through which the optical axis 1304 projects. Hence, in this embodiment, the position of the fluid film is controlled by rotating the fluid film generation unit 1312 around the optical axis 1304, thereby keeping the fluid film generation unit 1312 above the printing surface even when the optical head is positioned such that the optical axis approaches an edge or a corner of the printing surface.

It is noted that the apparatus described herein may advantageously be applied to the exposure of printing plates used in the graphical industry, e.g., in a computer-to-plate (CtP) process.

It is noted that the control means described herein can be implemented by means of hardware comprising several distinct elements, and by means of a suitably programmed microprocessor, computer, or the like. In the device claims enumerating several control means, processing means, and the like, several of these means can be embodied by one and the same item of hardware, e.g., a suitably programmed microprocessor or computer. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An apparatus for scanning a surface with electromagnetic radiation, the apparatus comprising:
a base plate having a planar support surface extending in a longitudinal direction and a transverse direction for supporting a medium having a marginal edge and a scanning surface to be scanned;
an optical head unit shiftable relative to the base plate in the longitudinal direction, and adapted to scan the scanning surface in both the longitudinal direction and the transverse direction with electromagnetic radiation propagating along an optical axis which is oriented generally perpendicular to both the longitudinal direction and the transverse direction;
a fluid film generation unit movably connected to the optical head unit and having at least one gliding surface with means through which pressurized air is ejected to generate a fluid film between the scanning surface of the medium and the gliding surface of the fluid film generation unit for maintaining a predetermined distance along the optical axis between the gliding surface and the scanning surface during scanning operation of the optical head unit across the scanning surface;
wherein the fluid film generation unit is movably connected to the optical head unit for sliding, linear translational movement in the longitudinal direction independently of and relative to the optical head unit, such that the optical head unit can slidingly shift linearly beyond the marginal edge of the medium, while the fluid film generated by the fluid film generation unit remains fully over the scanning surface of the medium to accurately maintain the predetermined distance between the gliding surface and the scanning surface, and thereby facilitate scanning the entirety of the scanning surface without any margins; and wherein
the apparatus further comprises an automated control operably connected to the optical head unit and the fluid film generation unit, wherein the automated control is configured to automatically detect the marginal edge of the medium, and automatically control the position of the fluid film in the longitudinal direction relative to the optical axis of the optical head unit in synchronization with the scanning operation, whereby the optical head unit can slidingly shift linearly beyond the marginal edge of the medium, while the fluid film generated by the fluid film generation unit remains fully over the scanning surface of the medium to accurately maintain the predetermined distance between the gliding surface and the scanning surface, and thereby facilitate scanning the entirety of the scanning surface without any margins.

2. The apparatus according to claim 1, wherein the fluid film generation unit is adapted to cause the fluid film to cover only a predetermined portion of the gliding surface of the fluid film generation unit that faces the scanning surface of the medium.

3. The apparatus according to claim 1, wherein the fluid film generation unit is adapted to cause one or more fluid films to be distributed around a fluid film center, and wherein the automated control is adapted to control a displacement of the fluid film center from the optical axis.

4. The apparatus according to claim 3, wherein the automated control is adapted to cause the fluid film generation unit to move relative to the optical axis along a scanning direction of the optical head unit across the scanning surface.

5. The apparatus according to claim 1, wherein the fluid film generation unit is mounted on at least one guide member connected to the optical head unit.

6. The apparatus according to claim 1, wherein the fluid film generation unit is pivotally mounted around the optical axis.

7. The apparatus according to claim 1, wherein the fluid film generation unit comprises a number of openings for delivering a fluid directed towards the scanning surface.

8. The apparatus according to claim 7, wherein at least one of the number of openings is at least partially filled with a porous material allowing the fluid to penetrate.

9. The apparatus according to claim 7, wherein the number of openings comprises a first and a second subset of openings wherein each subset is distributed within a respective predetermined area within the gliding surface and wherein the automated control is adapted to separately control a gas supply to the first and second subsets of openings.

10. The apparatus according to claim 9, wherein each of the subsets of openings is arranged around a respective fluid film center at a respective radial distance from the optical axis.

11. The apparatus according to claim 1, wherein the pressurized air ejection means comprises an opening in the fluid film generation unit that is at least partially filled with a porous material allowing the pressurized air to penetrate therethrough.

12. The apparatus according to claim 11, wherein the apparatus comprises a gas supply unit for providing pressurized gas to the opening via at least one gas supply line.

13. The apparatus according to claim 12, wherein the gas supply line comprises a buffer tank between the gas supply unit and the opening.

14. The apparatus according to claim 11, wherein the fluid film generation unit is adapted to generate a film of pressurized gas between the gliding surface and the scanning surface.

15. The apparatus according to claim 1, wherein the apparatus is an optical scanner for obtaining digital data from an original.

16. The apparatus according to claim 1, wherein the apparatus is a printer.

17. The apparatus according to claim 1, wherein the electromagnetic radiation for scanning the scanning surface is ultra-violet light.

18. The apparatus according to claim 1, further comprising a suspension device for suspending the optical head unit with the gliding surface facing the base plate.

19. The apparatus according to claim 18, wherein the suspension device comprises a parallelogram linkage relative to a support unit permitting movement of the optical head unit along the direction of the optical axis.

* * * * *